2,995,599
Patented Aug. 8, 1961

2,995,599
PROCESS FOR THE PRODUCTION OF ALKYL ESTERS OF 7-HYDROXYALKANOIC ACIDS
Amelio E. Montagna, Charleston, and Julius J. Brezinski, St. Albans, W. Va., and Donald G. Kubler, Columbia, S.C., assignors to Union Carbide Corporation, a corporation of New York
No Drawing. Filed July 13, 1959, Ser. No. 826,409
7 Claims. (Cl. 260—484)

The present invention relates to the hydrogenolysis of tetrahydropyran derivatives. In particular, the invention is concerned with the production of alkyl esters of 7-hydroxyalkanoic acids by the catalyzed hydrogenolysis of alkyl esters of tetrahydropyran-2-acetic acid and ring-substituted alkyl derivatives thereof.

The process of this invention can be defined more clearly in connection with the following general equation:

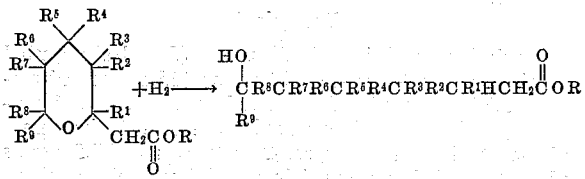

wherein R designates an alkyl radical containing from 1 to about 18 carbon atoms and preferably from 1 to about 8 carbon atoms, and $R^1$ to $R^9$ each designates a member selected from the group consisting of hydrogen and the lower alkyl radicals containing from 1 to about 4 carbon atoms.

The hydroxy-substituted alkanoic acid esters produced in accordance with the process of this invention are well known in the art and find suitable use in a variety of applications. The products have been found especially useful as chemical intermediates in the preparation of polymeric ester compositions, which polymeric materials in turn serve as efficient plasticizers for vinyl chloride resins.

In its broadest aspect, the process of this invention comprises hydrogenating an unsubstituted or ring-substituted tetrahydropyran-2-acetic acid ester of the type hereinabove described in an alkyl alcohol solution and in the presence of catalytic amounts of both a hydrogenation catalyst and a basic catalyst. In this manner, the tetrahydropyran-2-acetic acid ester reactant undergoes both ring rupture and hydrogenation and is converted to the corresponding 7-hydroalkanoic acid ester. Anhydrous conditions are generally maintained during this procedure. Recovery of the 7-hydroxyalkanoic acid ester product can thereafter be effected by the neutralization of the basic catalyst followed by the distillation of the neutralized reaction mixture. Any other convenient method of separation can also be employed.

As illustrative of the 7-hydroxyalkanoic acid esters that can be produced in accordance with the process of this invention there can be mentioned the following:

Ethyl 7-hydroxyheptanoate,
Ethyl 5-methyl-7-hydroxyheptanoate,
Ethyl 5-n-butyl-7-hydroxyheptanoate,
Ethyl 4-ethyl-5-methyl-7-hydroxyheptanoate,
n-Butyl 7-hydroxyheptanoate,
n-Butyl 5-isoproply-7-hydroxyheptanoate,
2-ethylhexyl 7-hydroxyheptanoate,
2-ethylhexyl 5-isopropyl-7-hydroxyheptanoate,
Dodecyl 7-hydroxyheptanoate,
Octadecyl 7-hydroxyheptanoate, and the like.

Among the unsubstituted or ring-substituted tetrahydropyran-2-acetic acid esters suitable for use as a reactant in the process of this invention, although others can also be employed, are the following:

Ethyl tetrahydropyran-2-acetate,
Ethyl 4-methyltetrahydropyran-2-acetate,
Ethyl 4-n-butyltetrahydropyran-2-acetate,
Ethyl 3-ethyl-4-methyltetrahydropyran-2-acetate,
n-Butyl tetrahydropyran-2-acetate,
n-Butyl 4-isopropyltetrahydropyran-2-acetate,
2-ethylhexyl tetrahydropyran-2-acetate,
2-ethylhexyl 4-isopropyltetrahydropyran-2-acetate,
Dodecyl tetrahydropyran-2-acetate,
Octadecyl tetrahydropyran-2-acetate, and the like.

In an embodiment of this invention, the tetrahydropyran-2-acetic acid ester reactant is admixed suitably with catalytic amounts of both a hydrogenation catalyst and a basic catalyst, and with an amount of an alkyl alcohol sufficient to dissolve the reactant. The presence of the alkyl alcohol solvent also serves to inhibit or minimize any polymerization of the subsequently formed 7-hydroxyalkanoic acid ester product which may otherwise occur via a transesterification reaction in which the hydroxyl radical of one of the product molecules and the ester radical of another product molecule are involved.

Of the hydrogenation catalysts which can be employed in the process of the invention, best results have been obtained utilizing a Raney nickel catlyst, due to the high catalytic activity generally exhibited thereby under alkaline reaction conditions. The choice of hydrogenation catalyst is not critical to the invention, however. Hence, other conventional hydrogenation catalysts known to be operative under alkaline reaction conditions, such as charcoal-supported platinum or palladium and the like, can also be used.

The concentration of the hydrogenation catalyst to be incorporated in the reaction mixture is not narrowly limited. For example, hydrogenation catalyst concentrations of from about 1 percent up to about 25 percent based upon the weight of the tetrahydropyran-2-acetic acid ester reactant, or higher, can be employed efficiently, with catalyst concentrations of from about 3 percent up to about 10 percent by weight of the tetrahydropyran-2-acetic acid ester being preferred. Within the operable range of hydrogenation catalyst concentration, a proportional increase in the rate of hydrogenation with increasing catalyst concentration has been observed. However, the advantage of an increased reaction rate ordinarily is not commensurate with the use of hydrogenation catalyst concentrations in excess of about 25 percent by weight of the tetrahydropyran-2-acetic acid ester. On the other hand, hydrogenation catalyst concentrations below about 1 percent by weight of the tetrahydropyran-2-acetic acid ester, while operable, may be expected to engender substantially reduced catalytic activity.

With regard to basic catalyst, any basic catalyst such as the type utilized in conventional transesterification reactions can be employed in accordance with the process of this invention. Further, particularly efficient results can be achieved in this connection using the alkoxides of either alkali metals or alkaline earth metals, such as the alkoxides of sodium, lithium, potassium or calcium etc., as the basic catalyst. In addition, such a catalyst is preferably selected from among those in which the alkyl radical is the same as that present in the ester radical of the tetrahydropyran-2-acetic acid ester undergoing reaction. Thus, the possibility of producing mixed 7-hydroxyalkanoic acid ester products containing more than one type of ester radical as the result of interaction between the tetrahydropyran-2-acetic acid ester reactant or the 7-hydroxyalkanoic acid ester product and the basic catalyst is precluded. It is to be noted in this respect that the basic catalyst can, if desired, be prepared in situ by the reaction of either an alkali metal or an alkaline earth metal with an alkyl alcohol as, for instance, the alkyl alcohol employed as a solvent as herein described.

The concentration of the basic catalyst used in the process of this invention can also be varied over a wide range. Thus, for example, basic catalyst concentrations of from about 0.1 up to about 2.0 percent based upon the weight of the tetrahydropyran-2-acetic acid ester reactant, or higher, can be utilized efficiently, with catalyst concentrations of from about 0.5 percent up to about 1.0 percent by weight of the tetrahydropyran-2-acetic acid ester being preferred. Substantially reduced catalytic effect may be expected, however, by the use of the basic catalyst in a concentration of less than about 0.1 percent by weight of the tetrahydropyran-2-acetic acid ester, while the advantage of increased catalytic activity is not commensurate with the use of basic catalyst concentrations in excess of about 2.0 percent by weight of the tetrahydropyran-2-acetic acid ester.

The alkyl alcohols found suitable for use as a solvent in the process of this invention include those containing from 1 to about 18 carbon atoms, and particularly, from 1 to about 8 carbon atoms. As typical of the suitable alcohols there can be mentioned methanol, ethanol, n-propanol, 2-propanol, n-butanol, iso-butanol, 2-ethylhexanol, decanol, tetradecanol, octadecanol, and the like, although other alkyl alcohols can also be employed. More, for reasons similar to those hereinabove described in connection with the selection of the basic catalyst, the alkyl alcohol utilized as a solvent is preferably one in which the alkyl radical is the same as that present in the ester radical of the tetrahydropyran-2-acetic acid ester undergoing reaction.

The alkyl alcohol is generally admixed with the tetrahydropyran-2-acetic acid ester reactant in at least an equimolar ratio, with greater amounts of the alkyl alcohol being preferred. In particular, to minimize or inhibit any transesterification, a molar excess of from about 6 to about 10 moles of the alkyl alcohol per mole of the tetrahydropyran-2-acetic acid ester is more preferred. It is to be noted, in this connection, that other solvents for the tetrahydropyran-2-acetic acid ester reactant, such as the diethyl ether of ethylene glycol, dioxane, tetrahydrofuran, and the like, if desired, can also be incorporated in the reaction mixture together with the alkyl alcohol.

The hydrogenation of the reaction mixture containing the tetrahydropyran-2-acetic acid ester reactant, the catalysts and the alkyl alcohol solvent is carried out in a suitable reactor, such as hydrogenation autoclave, at a temperature preferably within the range of from about 150° C. up to about 200° C., or slightly higher, and under an initial positive hydrogen pressure of from about 150 p.s.i.g. up to about 2,500 p.s.i.g., or slightly higher. More preferably, a reaction temperature of from about 175° C. up to about 200° C. and an initial hydrogen pressure of from about 500 p.s.i.g., and especially from about 1,200 p.s.i.g. up to about 1,800 p.s.i.g. are employed. The maximum operable temperature and hydrogen pressure is determined to a large extent by the temperature and hydrogen pressure at which excessive decomposition or undesirable side reactions occur. At temperatures above about 200° C., and at hydrogen pressures above about 2,500 p.s.i.g., for example, some hydrogenolysis of the ester bonds may occur, thus diminishing the yield of the desired product. On the other hand, reaction temperatures and hydrogen pressures below those hereinabove described, while operable, at best effect slow rates of reaction and thus may not engender a substantial yield of the desired product within an efficient period of operation.

Upon completion of the hydrogenation, the reaction mixture is preferably filtered to remove the hydrogenation catalyst and thereafter stripped of alcohol by distillation at temperatures desirably kept below about 75° C. The basic catalyst is then generally neutralized prior to the recovery of the 7-hydroxyalkanoic acid ester product. The neutralization can be effected, for example, by washing or extracting a water-immiscible solution of the product containing the basic catalyst, e.g., a diethyl ether or diisopropyl ether solution thereof, with a dilute aqueous mineral acid, such a dilute aqueous solution of hydrochloric, sulfuric or phosphoric acid. Following neutralization in this manner, the crude product is washed with water to remove any excess mineral acid, dried either by distilling off the water as an azeotrope with at least part of the solvent that is present or over a suitable inert drying agent such as anhydrous magnesium sulfate or sodium sulfate, and subsequently stripped of remaining solvent. The desired 7-hydroxyalkanoic acid ester product can thereafter be separated from the residue by fractional distillation, preferably under reduced pressure. Other convenient means of recovery can also be utilized.

The processes of the invention can be illustrated further in connection with the following specific examples of its practice.

*Example I*

A solution consisting of 860 grams (5 moles) of ethyl tetrahydropyran-2-acetate, 690 grams (15 moles) of ethanol, 5.25 grams of sodium metal (equivalent to 1 percent by weight of sodium ethoxide based upon the weight of the ethyl tetrahydropyran-2-acetate) and 77.5 grams of Raney nickel, contained in a stainless-steel autoclave, was hydrogenated by reaction with hydrogen at a temperature of 200° C., under an initial hydrogen pressure of 1,500 p.s.i.g., for a period of four hours. The hydrogenation was discontinued when hydrogen absorption ceased, as evidenced by the attainment of constant pressure within the autoclave. Upon the completion of the reaction, the reaction mixture was filtered to remove the Raney nickel catalyst and distilled at a temperature of 30° C., under a pressure of 150 mm. of mercury, whereby approximately 680 grams of ethanol were removed. The residual solution was diluted with 500 ml. of diisopropyl ether and extracted with sufficient 0.5 N sulfuric acid to neutralize the basic catalyst. The organic layer was then washed with water to remove trace amounts of acid remaining and then dried by distilling off the water as an azeotrope with diisopropyl ether. Subsequent fractional distillation of the dried organic layer yielded 132 grams (0.77 mole) of unreacted ethyl tetrahydropyran-2-acetate at a vapor temperature of between 63° C. and 65° C., under a reduced pressure of between 10 mm. and 1.2 mm. of mercury, and 343.5 grams (1.97 moles) of ethyl 7-hydroxyheptanoate at a vapor temperature of between 98° C. and 101° C., under a reduced pressure of 0.6 mm. of mercury. Approximately 221 grams of a polymeric residue was also obtained. The ethyl 7-hydroxyheptanoate product, obtained in a 39.5 percent yield based upon the weight of the ethyl tetrahydropyran-2-acetate reactant, was found to have a saponification equivalent of 176 (theoretical: 174.2) and a molecular weight of 176 (theoretical: 174.2) as determined by hydroxyl analysis assuming the presence of one hydroxyl group per molecule.

*Example II*

A solution consisting of 460 grams (2.5 moles) of ethyl 4-methyl-tetrahydropyran-2-acetate, 575 grams (12.5 moles) of ethanol, 4.5 grams of sodium metal and 40 grams of Raney nickel catalyst, contained in a stainless-steel autoclave, was hydrogenated, by reaction with hydrogen at a temperature of 200° C., under a hydrogen pressure of between 1,700 p.s.i.g. and 1,800 p.s.i.g. for a period of five hours. The hydrogenation was discontinued when hydrogen absorption ceased, as evidenced by the attainment of constant pressure within the autoclave. Upon completion of the reaction period, the reaction mixture was filtered to remove the Raney nickel catalyst and distilled at a temperature of 50° C., under a pressure of 500 mm. of mercury, whereby approximately 575 grams of ethanol were recovered. The residual solution was diluted with diethyl ether and the basic catalyst was neutralized by the addition of 38.4 grams of a 25 percent aqueous solution of sulfuric acid. The aqueous layer was then separated. The organic layer was washed with water to remove trace amounts of acid remaining and dried over sodium sulfate. Upon subsequent fractional distillation of the dried organic layer, ethyl 5-methyl-7-hydroxyheptanoate was obtained as a colorless sweet-smelling liquid at a vapor temperature of between 106° C. and 108° C., under a reduced pressure of 1 mm. of mercury. This product weighed 235 grams, representing a yield of 50.6 percent based upon the weight of the ethyl 4-methyltetrahydropyran-2-acetate reactant. The product had the following properties: saponification equivalent: 190 (theoretical: 188); molecular weight as determined by hydroxyl analysis: 189 (theoretical: 188); elemental analysis, percent by weight:

|   | Found | Calculated for $C_{10}H_{20}O_3$ |
|---|---|---|
| C | 63.7 | 63.8 |
| H | 10.9 | 10.6 |

What is claimed is:

1. A process for the production of alkyl 7-hydroxyalkanoic acid esters represented by the general formula:

wherein R designates an alkyl radical containing from 1 to about 18 carbon atoms and $R^1$ to $R^9$ each designates a member selected from the group consisting of hydrogen and the lower alkyl radicals, which process comprises admixing an alkyl tetrahydropyran-2-acetic acid ester represented by the general formula:

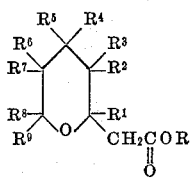

wherein R and $R^1$ to $R^9$ are as hereinabove defined, with catalytic amounts of both a hydrogenation catalyst and a basic transesterification catalyst and with an alkyl alcohol containing from 1 to about 18 carbon atoms in a proportion of at least about one mole of said alkyl alcohol per mole of said alkyl tetrahydropyran-2-acetic acid ester, hydrogenating the resultant solution and recovering from the hydrogenated product the alkyl 7-hydroxyalkanoic acid ester thereby formed.

2. A process for the production of alkyl 7-hydroxyalkanoic acid esters represented by the general formula:

wherein R designates an alkyl radical containing from 1 to about 18 carbon atoms and $R^1$ to $R^9$ each designates a member selected from the group consisting of hydrogen and the lower alkyl radicals, which process comprises admixing an alkyl tetrahydropyran-2-acetic acid ester represented by the general formula:

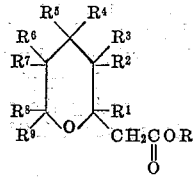

wherein R and $R^1$ to $R^9$ are as hereinabove defined, with catalytic amounts of both a hydrogenation catalyst and a basic transesterification catalyst and with an alkyl alcohol containing from 1 to about 18 carbon atoms in a proportion of at least about one mole of said alkyl alcohol per mole of said alkyl tetrahydropyran-2-acetic acid ester, hydrogenating the resultant solution at a temperature of between about 150° C. and about 200° C., under a hydrogen pressure of between about 150 p.s.i.g. and about 2,500 p.s.i.g., and recovering from the hydrogenated product the alkyl 7-hydroxyalkanoic acid ester thereby formed.

3. A process for the production of alkyl 7-hydroxyalkanoic acid esters represented by the general formula:

wherein R designates an alkyl radical containing from 1 to about 18 carbon atoms and $R^1$ to $R^9$ each designates a member selected from the group consisting of hydrogen and the lower alkyl radicals, which process comprises admixing an alkyl tetrahydropyran-2-acetic acid ester represented by the general formula:

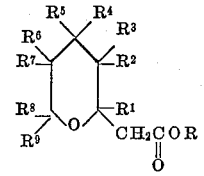

wherein R and $R^1$ to $R^9$ are as hereinabove defined, with catalytic amounts of both a hydrogenation catalyst and a basic transesterification catalyst and with an alkyl alcohol containing from 1 to about 18 carbon atoms in a proportion of at least about one mole of said alkyl alcohol per mole of said alkyl tetrahydropyran-2-acetic acid ester, hydrogenating the resultant solution at a temperature of between about 175° C. and about 200° C., under a hydrogen pressure of between about 1,200 p.s.i.g. and about 1,800 p.s.i.g., and recovering from the hydrogenated product the alkyl 7-hydroxyalkanoic acid ester thereby formed.

4. A process for the production of ethyl 7-hydroxyheptanoate which comprises admixing ethyl tetrahydropyran-2-acetate with catalytic amounts of both a hydrogenation catalyst selected from the group consisting of Raney nickel, platinum and palladium and a basic transesterification catalyst selected from the group consisting of the alkali metal alkoxides and the alkaline earth metal alkoxides, and with at least one mole of ethanol per mole of said ethyl tetrahydropyran-2-acetate, hydrogenating the resultant solution at a temperature of between about 150° C. and about 200° C., under a hydrogen pressure of between about 150 p.s.i.g. and about 2,500 p.s.i.g., and recovering from the hydrogenated product the ethyl 7-hydroxyheptanoate thereby formed.

5. The process according to claim 4 wherein the hydrogenation catalyst is Raney nickel and wherein the basic transesterification catalyst is sodium ethoxide.

6. A process for the production of ethyl 5-methyl-7-hydroxyheptanoate which comprises admixing ethyl 4- methyltetrahydropyran-2-acetate with catalytic amounts of both a hydrogenation catalyst selected from the group consisting of Raney nickel, platinum and palladium and a basic trans-esterification catalyst selected from the group consisting of the alkali metal alkoxides and the alkaline earth metal alkoxides, and with at least one mole of ethanol per mole of said ethyl 4-methyltetrahydropyran-2-acetate, hydrogenating the resultant solution at a temperature of between about 150° C. and about 200° C., under a hydrogen pressure of between about 150 p.s.i.g. and 2,500 p.s.i.g., and recovering from the hydrogenated product the ethyl 5-methyl-7-hydroxyheptanoate thereby formed.

7. The process according to claim 6 wherein the hydrogenation catalyst is Raney nickel and wherein the basic transesterification catalyst is sodium ethoxide.

No references cited.